United States Patent [19]

Mester

[11] Patent Number: 5,038,229
[45] Date of Patent: Aug. 6, 1991

[54] METHOD OF PERFORMING A TRACKING ADJUSTMENT OF A DIGITAL VIDEO RECORDING AND REPRODUCING EQUIPMENT

[75] Inventor: Roland Mester, Darmstadt, Fed. Rep. of Germany

[73] Assignee: BTS Broadcast Television Systems GmbH, Darmstadt, Fed. Rep. of Germany

[21] Appl. No.: 312,906

[22] Filed: Feb. 21, 1989

[30] Foreign Application Priority Data

Mar. 23, 1988 [DE] Fed. Rep. of Germany ....... 3809688

[51] Int. Cl.$^5$ ............................................. G11B 5/008
[52] U.S. Cl. ................................ 360/38.1; 360/77.13; 358/36
[58] Field of Search ................... 360/38.1, 10.2, 73.08, 360/77.13, 32, 70, 78.01; 358/320, 321, 36

[56] References Cited

U.S. PATENT DOCUMENTS

| | | | |
|---|---|---|---|
| 4,485,399 | 11/1984 | Schulz et al. | 358/36 |
| 4,578,719 | 3/1986 | Heitmann et al. | 360/77.13 |
| 4,647,990 | 3/1987 | Sasamura | 360/77.13 |

OTHER PUBLICATIONS

"Videorecorder-Technik", published by Vogel-Verlag/Wurzburg, 1979, pp. 78–82.

Primary Examiner—Roy N. Envall, Jr.
Assistant Examiner—Hung Dang
Attorney, Agent, or Firm—Frishauf, Holtz, Goodman & Woodward

[57] ABSTRACT

A magnetic tape recorder/reproducer for digital video signals has an error recognition circuit unit as well as circuit units for correction and/or concealment of recognized errors in the video signal. During a tracking adjustment procedure a manual control added to the tracking adjuster reduces the capability of error correction and/or concealment by black-marking erroneous words recognized in the luminance portion of the digital video signal.

5 Claims, 1 Drawing Sheet

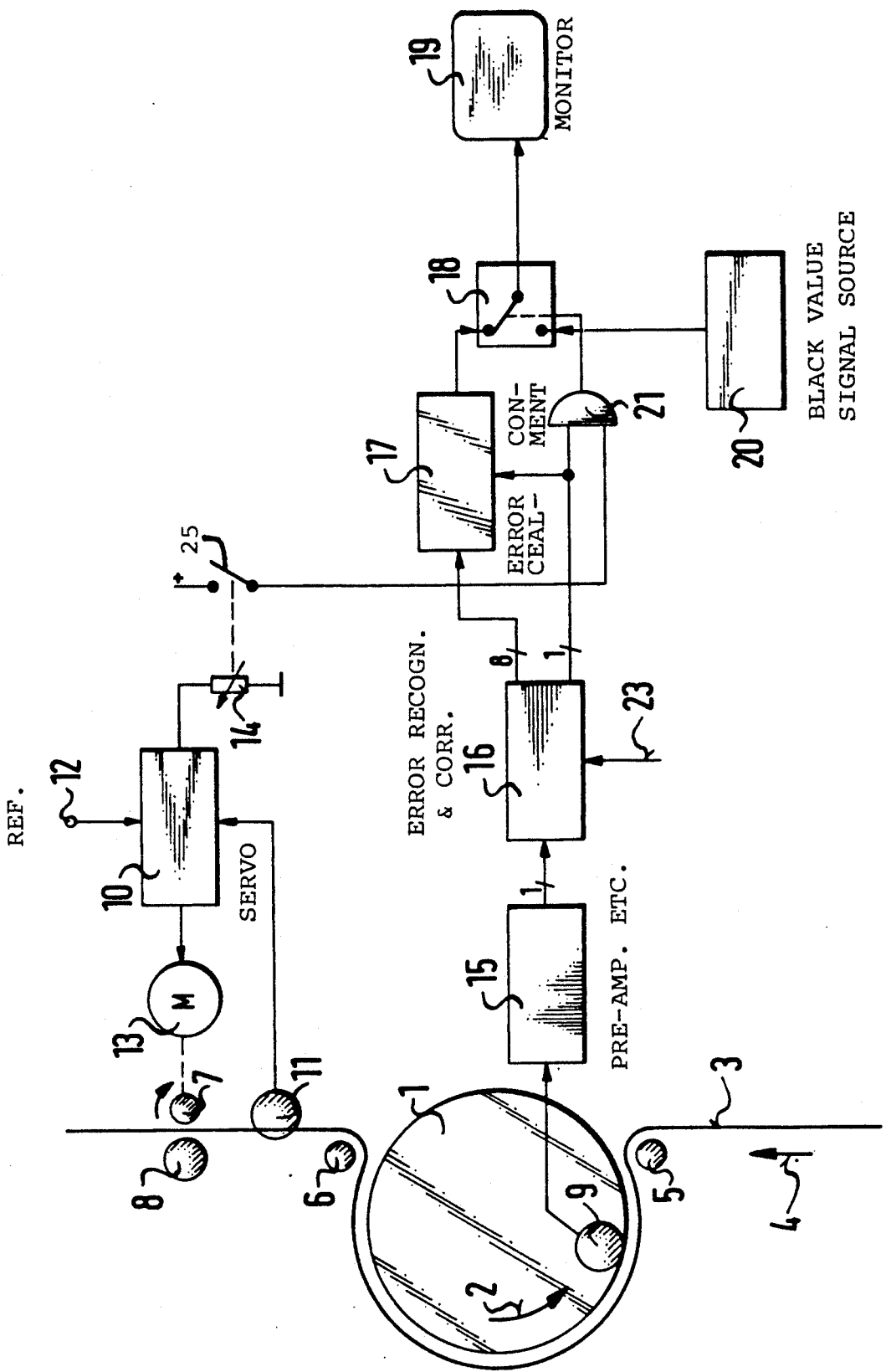

METHOD OF PERFORMING A TRACKING ADJUSTMENT OF A DIGITAL VIDEO RECORDING AND REPRODUCING EQUIPMENT

BACKGROUND OF THE INVENTION

This invention concerns adjusting the tracking of a magnetic tape digital video recording and reproducing equipment of the kind having a rotary multiple-head device for obliquely scanning a lengthwise-moving magnetic tape, which equipment also includes a servo control system controlling the speed of lengthwise motion of the tape by reference to a manually variable electrical reference signal and a signal derived from motion of the tape and also includes a manual tracking adjustment means and apparatus for correction and/or concealment of errors.

A book by Friedrich Manz, "Videorecorder-Technik" published by Vogel-Verlag/Wurzburg, 1979 pgs. 78-82, describes the recording of video signals on magnetic tape, the rotating heads of a scanning device and the playback of such signals from the magnetic tape with the same device. A servo unit or system controls the tendency of the tape transport speed to fluctuate. By intervening in the phasing of the servo it is possible to correct tracking errors with a tracking adjustment knob. The tracking adjustment knob is to be adjusted so that a television picture of the reproduced video signal, used for an adjustment criterion during the adjustment procedure will have the least possible disturbances. In magnetic tape equipment for recording and reproducing digital video signals there are usually provided circuits for error correction and error concealment in the playback portion of the equipment, which correct erroneous data in the reproduced video signal and conceal uncorrectible errors. When a tracking adjustment is made these digital circuit devices prevent obtaining any sensitive evaluation of the disturbances in the television picture. It is in fact impossible to determine optically whether the magnetic heads of the scanning device are centered on the recorded tracks which they are reading.

SUMMARY OF THE INVENTION

It is an object of the present invention to provide a method by which optical evaluation of disturbances in reproduced television picture is facilitated and tracking can be adjusted optimally.

Briefly, the capability of the apparatus for correction and/or concealment of errors is at least partially disabled during adjustment of the manual tracking adjustment means. This has the advantage during tracking adjustment that disturbances in the television pictures are recognizable and correspond quantitatively to the error rate of digital video signals read out from the magnetic tape. It is particularly advantageous if only data words in the luminance component of the digital video signal which are recognized as erroneous are visibly marked by substituting a black-designating word (i.e. keying these words black). In this way the individual erroneous data words in the television picture are emphasized and made quite plainly visible by marking them black.

BRIEF DESCRIPTION OF THE DRAWING

Further advantages and details of the invention are explained by way of an illustrative example, with reference to the annexed drawing, the single figure of which is a circuit block diagram of an apparatus with which the method of the invention can readily be practiced.

DESCRIPTION OF THE ILLUSTRATED EMBODIMENT

In the drawing there is shown a headwheel disk 1 that rotates in the direction of the arrow 2. A magnetic tape 3 is looped around the headwheel disk. Transport of the magnetic tape in the direction 4 is deflected, for adequately looping around the headwheel disk, by two guide elements 5 and 6. The combination of a drive shaft 7 and a rubber pressure roller 8 produces the advance ("transport") of the magnetic tape 3. A number of playback magnetic heads are affixed to the circumference of the headwheel disk 1. For simplification of the drawing, only one playback magnetic head 9 is illustrated in the circuit block diagram of the illustrated embodiment.

In magnetic tape equipment for recording and playback digital video signals on or from tracks running obliquely to the edges of the magnetic tape 3, tracking control in playback operation is performed by conforming the position of the magnetic tape relative to the rotating playback magnetic heads on the headwheel 1 by means of a servo 10. During recording signals are derived from the synchronizing pulses of the arriving video signal which are immediately recorded in a control track of the magnetic tape 3 as control track signals. In playback these recorded control track signals serve for regulating the tape drive for controlling the track pattern. For this purpose the recorded control track signal is picked up by means of a control track magnetic head 11 from the control track and supplied to the servo 10. The control track signal is compared in the servo 10 with a reference signal REF provided at a terminal 12. From that comparison a control voltage (error signal) for regulating the rotary speed of a motor 13 is generated. The motor 13 is mechanically coupled with the drive shaft 7. The servo 10 is commonly constituted as a phase regulating loop in which the error signal results from a phase comparison and in which the instantaneous phase can be varied by means of an adjusting element 14. The adjustment element 14 is usually called a tracking adjuster.

The playback magnetic head 9 is connected through a rotary transformer (not shown) with a circuit unit 15 in which the digital video signals read out from the tape are preamplified and compensated for distortion. At the output of the circuit unit 15 the video signal read out from the magnetic tape 3 is available in serial form. The serial video signal is first subjected to conversion of data words from serial to parallel form in a circuit unit 16 which also performs error recognition and error correction by reference to error protection words (check words) added to the digital video signal in recording. Details of this operation are to be found in the printed publication "Standard for Recording Digital Television Signals on Magnetic Tapes and Cassettes" of the European Broadcasting Union, Tech. 3522-E, or in the copending patent application of the present applicant, Ser. No. 07/198,131 filed May 24, 1988 now U.S. Pat. No. 4,914,661. In the output of the circuit unit 16 there are provided an error corrected video signal in word-parallel form and an error evaluation signal, which is called an error flag, when an error is recognized. The error flag designates by logic level positions the data word that has been recognized as erroneous.

The word-parallel video signal is then supplied to a circuit unit 17 for error concealment (unless the error can be corrected in the circuit 16). An error concealment circuit unit is known, for example, from U.S. Pat. No. 4,485,399. The error flag signal available at the output of the unit 16 causes the unit 17 to insert a substitute value into the digital video signal in place of uncorrectible data values. The substitute values can, for example, be derived from error-free data values of neighboring pixels (picture elements or picture points). The output signal of the unit 17 is then supplied to a playback display monitor 19 through a controllable selector switch 18, the function of which is described below.

In the illustrated embodiment, during a tracking adjustment operation a digital black value is substituted ("keyed") into the luminance portion of the digital video signal in place of error-corrected or error-concealing data values. For this purpose a circuit 20 applies to another input of the control selector switch 18 a digital value which has the black-producing value "0". The error flag controls selector switch 18 to make "(key") a substitution only when another signal is, also present at an AND gate 21. That other signal is generated in a first variant form of the illustrated embodiment by means of a manually controlled switch contact. In that case pressure on the tracking adjuster 14, which itself is provided as a potentiometer, activates contacts of a switch 25 which apply a "high" logic voltage level to one input of the AND gate 21, so that the error flag signal can be supplied for the control of the selector switch 18.

In a second variant of the illustrated embodiment the signal additional to the error flag is obtained from a keyboard or control panel element used for initiating operation in the playback mode. By pressure on a playback key or button in a certain way the unit 17 can be switched off for bringing about a tracking adjustment procedure in order to key black values into the digital video signal instead of the data words in which errors have been corrected or concealed.

In still another variant for generating the above-mentioned additional signal, a tracking adjustment procedure is built into a special test routine. The test routine then makes the additional signal for the AND gate 21 available.

In playback operation a preliminary calibration procedure for setting the tracking is carried out by switching on the above-mentioned additional signal by which the data values recognized as erroneous are, for a while, marked black. The number of black markings can be varied by stepping up or down the error correction capability by an adjustment 23, in order to observe visible picture changes more distinctly to produce a fine adjustment of the tracking adjuster 14. The tracking adjustment made with the tracking adjuster 14 can then be considered correct when the recognizable disturbances displayed by the monitor 19 are at a minimum. It can then be concluded that the playback magnetic heads are well centered on the tracks for reading the recorded tracks.

Although the invention has been described with reference to a few variations of a particular illustrated example, it will be recognized that further variations and modifications are possible within the inventive concept.

I claim:

1. A method of performing a tracking adjustment of a videotape recorder (VTR) for recording and reproducing digital video signals, which VTR includes a rotary multiple-head device for obliquely scanning a lengthwise-moving magnetic tape, a servo control system for controlling the speed of lengthwise motion of the tape in a manner dependent on a manually variable reference signal and a signal derived from motion of the tape, manual tracking-adjustment means, for a user who is monitoring, in a reproducing mode of operation of said VTR, a reproduced picture produced from a video signal, for manual adjustment by said user of the said manual tracking-adjustment means for optimum picture quality and apparatus for correction and/or concealment of errors, said method comprising the steps of:

at least partially disabling said apparatus for correction and/or concealment or errors during manual adjusting of said manual tracking adjustment means, and adjusting the manual tracking-adjustment means to obtain a minimum of visible errors in the reproduced picture produced by said digital video signal.

2. A method according to claim 1 wherein said at least partially disabling of said apparatus for correction and/or concealment of errors is performed by replacing words of said digital video signal in which an error has been recognized by respective words designating a black pixel.

3. A method according to claim 2 wherein recognized errors in the luminance portion of the digital video signal are marked black and recognized errors in the chrominance portion of the digital video signal are processed by said apparatus for correction and/or concealment of errors in a partially disabled state thereof.

4. A method according to claim 1, wherein capability for correction of errors of the digital video signal is reduced by activation of a switch element whereby black values are substituted in the luminance portion of the digital video signal in place of data values recognized as erroneous.

5. A method according to claim 4, wherein said switch element is manually controlled by means of a pressure responsive control panel element.

* * * * *